(12) United States Patent
Ogawa et al.

(10) Patent No.: US 9,790,402 B2
(45) Date of Patent: Oct. 17, 2017

(54) ADHESIVE COMPOSITION FOR POLARIZER AND POLARIZER USING SAME

(71) Applicant: CHEIL INDUSTRIES INC., Gyeongsangbuk-do (KR)

(72) Inventors: Hirosh Ogawa, Yokohama (JP); Tatsuhiro Suwa, Yokohama (JP)

(73) Assignee: CHEIL INDUSTRIES, INC., Gumi-Si, Gyeongsangbuk-Do (KR)

(*) Notice: Subject to any disclaimer, the term of this patent is extended or adjusted under 35 U.S.C. 154(b) by 447 days.

(21) Appl. No.: 14/383,753

(22) PCT Filed: Feb. 14, 2013

(86) PCT No.: PCT/KR2013/001153
§ 371 (c)(1),
(2) Date: Sep. 8, 2014

(87) PCT Pub. No.: WO2013/133539
PCT Pub. Date: Sep. 12, 2013

(65) Prior Publication Data
US 2015/0099127 A1    Apr. 9, 2015

(30) Foreign Application Priority Data

Mar. 9, 2012  (JP) ................. 2012-053615

(51) Int. Cl.
*C09J 4/00* (2006.01)
*G02B 1/10* (2015.01)
*G02B 5/30* (2006.01)
*G02B 1/14* (2015.01)

(52) U.S. Cl.
CPC ........ *C09J 4/00* (2013.01); *G02B 1/14* (2015.01); *G02B 5/305* (2013.01); *G02B 1/105* (2013.01); *G02B 5/3033* (2013.01); *Y10T 428/31515* (2015.04)

(58) Field of Classification Search
None
See application file for complete search history.

(56) References Cited

U.S. PATENT DOCUMENTS

2003/0004221 A1* 1/2003 Sakurai ............. C08F 222/1006
522/15

FOREIGN PATENT DOCUMENTS

| CN | 102012535 A | 4/2011 |
|---|---|---|
| JP | 08-216322 A | 8/1996 |
| JP | 2005-036077 A | 2/2005 |
| JP | 2010-078699 A | 4/2010 |
| KR | 1997-0048905 A | 7/1997 |
| KR | 10-2010-0011179 A | 2/2010 |
| TW | 201109405 A | 3/2011 |
| WO | WO-2005/085383 A1 | 9/2005 |
| WO | WO-2008-001722 A1 | 1/2008 |

OTHER PUBLICATIONS

Office Action mailed Aug. 20, 2014 in corresponding Taiwanese Patent Application No. 102108247.

* cited by examiner

*Primary Examiner* — Sheeba Ahmed
(74) *Attorney, Agent, or Firm* — Lee & Morse, P.C.

(57) ABSTRACT

Disclosed herein is an adhesive composition for polarizing plates having increased adhesion by preventing curing inhibition due to moisture. The present invention provides an adhesive composition for polarizing plates, comprising: (A) a radical polymerizable monomer; (B) a cationic polymerizable monomer; (C) an unsaturated dicarboxylic acid anhydride; and (D) an initiator.

9 Claims, 1 Drawing Sheet

【Figure 1】
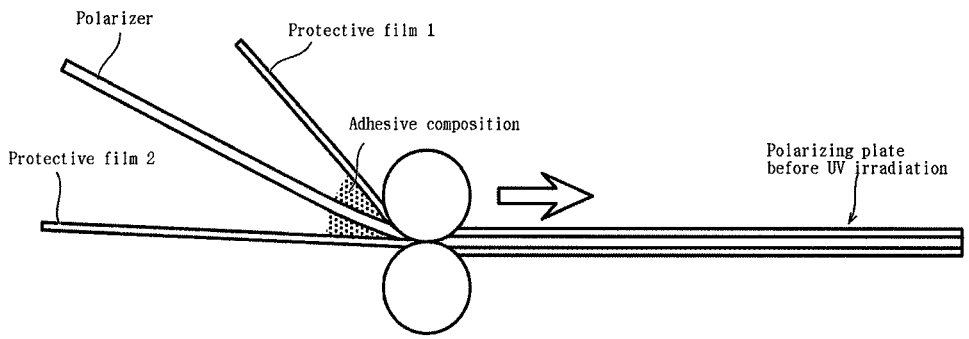
【Figure 2】
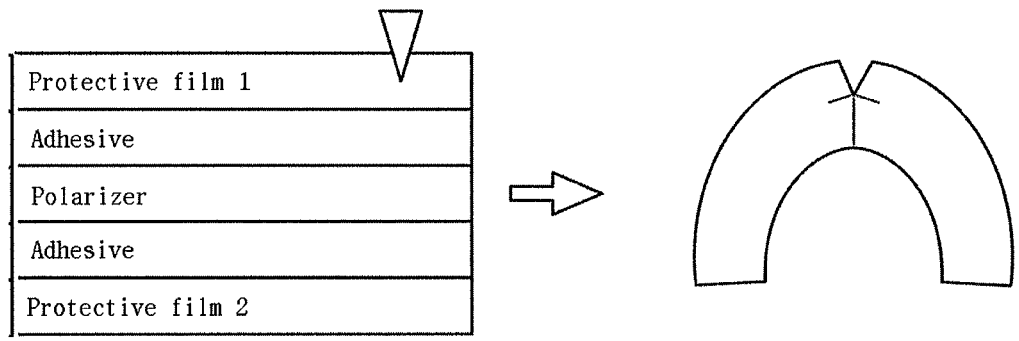
【Figure 3】
(a)                              (b)
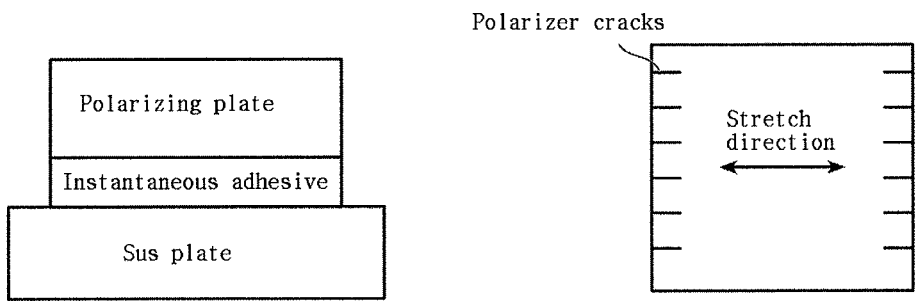

ADHESIVE COMPOSITION FOR POLARIZER AND POLARIZER USING SAME

TECHNICAL FIELD

The present invention relates to an adhesive composition for a polarizing plate to attach a protective film to a polarizer, and a polarizing plate using the same. More particularly, the present invention relates to an adhesive composition exhibiting excellent adhesion under high humidity, and a polarizing plate using the same.

BACKGROUND ART

In recent years, flat panel displays such as liquid crystal displays or plasma displays are broadly used in view of saving space and realizing high definition. Among these, the liquid crystal displays have attracted attention since they can save electricity and realize high definition, and developments thereof are ongoing.

A polarizer serving as an optical shutter is used along with liquid crystals in a liquid crystal display panel. The polarizing plate is provided with a polarizer and is an essential component of the liquid crystal display panel. In general, polarizers are prepared by uniaxial stretching a polyvinyl alcohol resin in a water bath by 5~6 times, thus conventional polarizers tend to be easily torn in stretched direction and have low hardness. For this reason, polarizing plates prepared by attaching a protective film to the surface and/or back of the polarizer, are used in the art. When an adhesive used to attach a protective film to a polarizer for be applied to a polarizing plate, the adhesive is required to meet specific conditions.

Japanese Patent Laid-Open Publication No. 2005-036077 discloses an adhesive for polarizing plates prepared by curing a copolymer prepared by copolymerizing multivalent carboxylic acid or an anhydride thereof and a monomer having epoxy groups through electron beam irradiation. In addition, WO 2005/085383 discloses an aqueous adhesive for polarizer devices containing a polyvinyl alcohol resin, a resin containing a maleic anhydride skeleton in its structure, and a crosslinking agent.

Further, Japanese Patent No. 456139 discloses a photocurable adhesive including: a base resin consisting of a radical polymerizable compound, which mainly includes a monofunctional radical polymerizable compound, and a cationic polymerizable compound, which mainly includes a cationic polymerizable compound containing no (meth)acryloyl group: a photoradical polymerization initiator; and a photocationic polymerization initiator.

Polarizers generally contain moisture since the polarizers are prepared through stretching in a water bath as set forth above. The cationic polymerizable compound used in the art is cured at some period of time after ultraviolet irradiation and the like. In this case, curing may be inhibited by moisture, thereby generally deteriorating initial curing properties. This problem becomes more conspicuous when polarizing plates are prepared particularly under high humidity. On the other hand, since curing of the adhesive using the radical polymerizable compound is not inhibited, initial curing properties are good. However, the adhesive has a disadvantage in that adhesion between the polarizer and the protective film is slightly deteriorated.

Furthermore, the adhesive of Japanese Patent No. 456139 employing the cationic polymerizable compound and radical polymerizable compound fails to overcome the problem of curing inhibition due to moisture, and thus has insufficient initial curing properties and adhesion.

DISCLOSURE

Technical Problem

It is an aspect of the present invention to provide an adhesive composition for polarizing plates, curing of which is not inhibited by moisture, and which has excellent initial curing properties and adhesion.

It is another aspect of the present invention to provide a polarizing plate exhibiting sufficient adhesion using the adhesive composition even in the case where the polarizing plate is prepared under high humidity conditions.

Technical Solution

As a result of intensive study to solve the problems in the art, the present inventors found that the introduction of a specific amount of acid anhydride to a radical polymerizable compound and a cationic polymerizable compound could lead to an adhesive for polarizing plates, curing of which is not inhibited by moisture, and which has excellent adhesion. The present invention has been attained on the basis of this finding.

One aspect of the present invention relates to an adhesive composition for polarizing plates. The adhesive composition for polarizing plates includes: (A) a radical polymerizable monomer; (B) a cationic polymerizable monomer; (C) an unsaturated dicarboxylic acid anhydride; and (D) an initiator.

In one embodiment, the adhesive composition for polarizing plates includes (A) the radical polymerizable monomer in an amount of 26.1 parts by weight to 79.8 parts by weight; (B) the cationic polymerizable monomer in an amount of 20 parts by weight to 60.9 parts by weight; (C) the unsaturated dicarboxylic acid anhydride in an amount of 0.2 parts by weight to 13 parts by weight; and (D) the initiator in an amount of 0.5 parts by weight to 10 parts by weight based on 100 parts by total weight of (A), (B) and (C).

The (D) initiator may include (D1) a radical polymerization initiator, (D2) a cationic polymerization initiator, or mixtures thereof.

The (D1) radical polymerization initiator may be present in an amount of 0.5 parts by weight to 5 parts by weight based on 100 parts by total weight of (A), (B) and (C), and the (D2) cationic polymerization initiator may be present in an amount of 0.5 parts by weight to 5 parts by weight based on 100 parts by total weight of (A), (B) and (C).

The unsaturated dicarboxylic acid anhydride may include at least one of maleic anhydride and itaconic anhydride.

In one embodiment, the radical polymerizable monomer may be present in an amount of 45 parts by weight to 55 parts by weight, the cationic polymerizable monomer may be present in an amount of 55 parts by weight to 45 parts by weight, the unsaturated dicarboxylic acid anhydride may be present in an amount of 0.8 parts by weight to 8 parts by weight.

The radical polymerizable monomer may be a monomer having any one of an acryloyl group, a methacryloyl group, a vinyl group and an allyl group, and the cationic polymerizable monomer may have any one of an epoxy group, an oxetane ring and a vinyl ether group.

The adhesive composition for polarizing plates may further include (E) a photosensitizer. The (E) photosensitizer may be present in an amount of 0.1 parts by weight to 5 parts by weight based on 100 parts by total weight of (A), (B) and (C).

Another aspect of the present invention relates to a polarizing plate including a protective film and a polarizer attached to each other using the adhesive composition.

Advantageous Effects

An adhesive composition of the present invention has excellent initial curing properties and excellent adhesion, because of that deteriorating of initial curing properties are inhibited even when the adhesive composition applied to polarizing plate under a high humidity conditions. Thus, a polarizing plate using the adhesive composition has excellent adhesion with a protective film and exhibit high durability.

DESCRIPTION OF DRAWINGS

FIG. 1 is a schematic view of a process for producing a polarizing plate in Examples.

FIG. 2 is a sectional view explaining a method of forced peeling testing in Examples.

FIG. 3 is a schematic view explaining a method of heat shock testing in Examples. (a) is a schematic sectional view of specimens, and (b) is a schematic view representing a position at which polarizer cracks are measured.

BEST MODE

The present invention will be explained in detail.

(1) Adhesive Composition for Polarizing Plates

The present invention relates to an adhesive composition for polarizing plates including (A) a radical polymerizable monomer; (B) a cationic polymerizable monomer; (C) an unsaturated dicarboxylic acid anhydride; and (D) an initiator.

In one embodiment, the adhesive composition for polarizing plates includes (A) a radical polymerizable monomer; (B) a cationic polymerizable monomer; (C) an unsaturated dicarboxylic acid anhydride; (D1) a radical polymerization initiator; and (D2) a cationic polymerization initiator.

In another embodiment, the adhesive composition for polarizing plates includes (A) a radical polymerizable monomer; (B) a cationic polymerizable monomer; (C) an unsaturated dicarboxylic acid anhydride; (D2) a cationic polymerization initiator; and (E) a photosensitizer.

In some embodiments, the adhesive composition for polarizing plates includes: (A) the radical polymerizable monomer in an amount of 26.1 parts by weight to 79.8 parts by weight; (B) the cationic polymerizable monomer in an amount of 20 parts by weight to 60.9 parts by weight; (C) the unsaturated dicarboxylic acid anhydride in an amount of 0.2 parts by weight to 13 parts by weight; and, based on 100 parts by total weight of (A), (B) and (C), (D1) at least one of the radical polymerization initiator in an amount of 0.5 parts by weight to 5 parts by weight and the photosensitizer in an amount of 0.1 parts by weight to 5 parts by weight, and (D2) the cationic polymerization initiator in an amount of 0.5 parts by weight to 5 parts by weight.

As described above, adhesives for polarizing plates generally known in the art have problems in that curing properties of the adhesives are inhibited by moisture and humidity in the polarizer. Specifically, in the case where a cationic polymerizable monomer is used, the adhesives are cured by dark reaction over several dozens of hours immediately after the ultraviolet irradiation. In this case, since the adhesives can be easily affected by moisture, the adhesives are deteriorated in initial curing properties, thereby making it difficult to obtain sufficient adhesion after dark reaction.

In order to avoid this problem, the present invention employs the cationic polymerizable monomer along with the radical polymerizable monomer and unsaturated dicarboxylic acid anhydride. Although the detailed mechanism of preventing curing inhibition of the adhesive composition due to moisture and providing excellent initial curing properties and adhesion is not clear, it is assumed to be as follows.

The unsaturated dicarboxylic acid anhydride is reacted with the radical polymerizable monomer due to the presence of unsaturated bonds to form a structure in which a dicarboxylic anhydride portion is introduced into a polymer constituting the adhesive. This dicarboxylic anhydride portion may be hydrolyzed by moisture penetrated into the adhesive composition, generating a carboxylic group. Accordingly, it is believed that the dicarboxylic anhydride initially absorbs moisture, thereby preventing reaction of the cationic polymerizable monomer under ultraviolet irradiation from being inhibited by environmental moisture or moisture within the polarizer. In addition, it is also believed that absorption of moisture by the cationic polymerizable monomer prevents curing by dark reaction of the cationic polymerizable monomer from being inhibited by moisture. Moreover, it is assumed that the carboxylic group derived from the dicarboxylic anhydride is bonded to a surface of the protective film through hydrogen bonding, improving adhesion. Although research in the art is focused on developing an adhesive by removing moisture as much as possible so as to prevent curing inhibition of the cationic adhesive due to moisture, it can be said that the present invention actively employs moisture which enters the adhesive composition.

Hereinafter, the (A) radical polymerizable monomer, the (B) cationic polymerizable monomer, the (C) unsaturated dicarboxylic acid anhydride, the (D1) radical polymerization initiator, the (D2) cationic polymerization initiator, the (E) photosensitizer, and a method of preparing the adhesive composition will be described.

(A) Radical Polymerizable Monomer

As the radical polymerizable monomer, any radical polymerizable monomer may be used without limitation as long as the monomer allows radical polymerization. Examples of the radical polymerizable monomer may include monomers having an allyl group, vinyl group, acryloyl group, methacryloyl group, maleimide group, (meth)acrylamide group, or the like, (meth)acrylic acid and derivatives thereof, styrene and derivatives thereof, (meth)acrylonitrile, (meth)acrylamide and derivatives thereof, maleimide and derivatives thereof, vinyl esters, or the like. Among these, monomers having an acryloyl group, methacryloyl group, vinyl group and allyl group are particularly preferred. These monomers may be used alone or in combination of two or more thereof.

More specifically, examples of the radical polymerizable monomer may include followings:

(meth)acrylic acid and salts thereof;

(meth)acrylic acid ester compounds such as methyl(meth)acrylate, ethyl(meth)acrylate, n-propyl(meth)acrylate, n-butyl(meth)acrylate, isobutyl(meth)acrylate, tert-butyl(meth)acrylate, (meth)acrylate, cyclohexyl(meth)acrylate, 2-ethylhexyl(meth)acrylate, lauryl(meth)acrylate, 2-methoxyethyl(meth)acrylate, 2-hydroxyethyl(meth)acrylate, 2-hydroxypropyl(meth)acrylate, 2-hydroxybutyl(meth)acrylate, 4-hydroxybutyl(meth)acrylate, glycerol mono (meth)acrylate, 3-chloro-2-hydroxypropyl(meth)acrylate, 2-hydroxy-3-phenoxypropyl(meth)acrylate, ethylene glycol di(meth)acrylate, diethylene glycol di(meth)acrylate, triethylene glycol di(meth)acrylate, butylene glycol di(meth)acrylate, nonaethylene glycol di(meth)acrylate, polypropylene glycol di(meth)acrylate, dipropylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, trimethylolpropane tri(meth)acrylate, neopentyl glycol di(meth)acrylate, pentaerythritol tri(meth)acrylate, trimethylolethane tri(meth)acrylate, isobornyl(meth)acrylate, N-vinyl pyrrolidone, acryloylmorpholine, urethane(meth)acrylate, tetrahydrofurfuryl(meth)acrylate, (meth)acrylate of mono ε-caprolactone adducts of tetrahydrofurfuryl alcohol, (meth)acrylate of di ε-caprolactone adducts of tetrahydrofurfuryl alcohol, (meth)acrylate of mono β-methyl-δ-valerolactone adducts of tetrahydrofurfuryl alcohol, (meth)acrylate of di β-methyl-δ-valerolactone adducts of tetrahydrofurfuryl alcohol, ω-carboxy-polycaprolactone monoacrylate, or the like;

styrene compounds such as styrene, vinyl toluene, α-methylstyrene, dimethyl styrene, chlorostyrene, t-butyl styrene, styrenesulfonic acid and salts thereof, or the like;

nitrile group-containing vinyl compounds such as acrylonitrile, methacrylonitrile, and the like;

amide group-containing vinyl compounds, such as (meth)acrylamide, N-methyl(meth)acrylamide, N-ethyl(meth)acrylamide, N-propyl(meth)acrylamide, N-isopropyl(meth)acrylamide, N-butyl(meth)acrylamide, N,N-dimethyl(meth)acrylamide, N,N-diethyl(meth)acrylamide, N,N-dimethylaminopropyl(meth)acrylamide, N-(hydroxyethyl)acrylamide, N-isopropyl(meth)acrylamide, N-methylol (meth)acrylamide, diacetone(meth)acrylamide, N,N-methylene bis(meth)acrylamide, or the like;

vinyl ester compounds such as vinyl acetate, vinyl propionate, vinyl pivalate, vinyl benzoate, vinyl cinnamate, or the like;

maleimide, N-alkyl-substituted maleimide;

and conjugated diolefins such as 1,3-butadiene, isoprene, or the like.

The radical polymerizable monomer may be commercially available products. Examples of the radical polymerizable monomer include KAYARAD Series (Nihon Kayaku Co. Ltd.), ADEKA OPTOMER® KR•BY Series (ADEKA Co. Ltd.), KOEIHARD Series (KOEI Kagaku Kogyo Co. Ltd.), Seika Beam® Series (Dainichi Seika Kogyo K.K.), KRM Series (Daicell Cytec Co. Ltd.), EB series, UVECRYL® Series (Daicell UCB Co. Ltd.), Unidic series, RC Series (DIC Co. Ltd.), Olex® Series (Chugoku Paints Co. Ltd.), Sanlard® H series, Sanlard® RC Series (Sanyo Kasei Kogyo Co. Ltd.), SP Series (Showa Kobunshi Co. Ltd.), RCC Series (Grace Japan Co. Ltd.), Artresin UN series, Aronix® M Series (Toagosei Co. Ltd.), B420 (Shinnakamura Kagaku Kogyo Co. Ltd.), Hi-Coap AU Series (Tokushiki Co. Ltd.), UL-503LN (Kyoeisha Kagaku Co. Ltd.), Denacol acrylate DA Series (Nagase Chemdex Corp.), or the like.

In addition, in the present invention, the radical polymerizable monomer may include both the radical polymerizable group and the cationic polymerizable group. Examples of the radical polymerizable monomer may include a compound having both a (meth)acryloyl group and a vinylether group, a compound having a vinyl group and an oxetane ring, or the like. More specifically, examples of the radical polymerizable monomer may include 2-(2-vinyloxyethoxyl)ethyl(meth)acrylate, ethyl oxetane methyl vinyl ether, or the like.

The radical polymerizable monomer may be present in an amount of 26.1 parts by weight to 79.8 parts by weight based on 100 parts by total weight of the (A) radical polymerizable monomer, (B) cationic polymerizable monomer and (C) unsaturated dicarboxylic acid anhydride. Within this range, the unsaturated dicarboxylic acid anhydride can be sufficiently introduced into the adhesive, curing inhibition of the adhesive due to moisture can be prevented, and sufficient adhesion can be ensured. In one embodiment, the radical polymerizable monomer (A) may be present in an amount of 30 parts by weight to 60 parts by weight, preferably 45 parts by weight to 55 parts by weight, based on 100 parts by total weight of the (A) radical polymerizable monomer, (B) cationic polymerizable monomer and (C) unsaturated dicarboxylic acid anhydride.

(B) Cationic Polymerizable Monomer

As the cationic polymerizable monomer, any conventionally known cationic polymerizable monomer may be used without limitation as long as the cationic polymerizable monomer can be cured by cationic polymerization. More specifically, examples of the cationic polymerizable monomer may include compounds having an epoxy group, vinyl ether group, cyclic ether group, cyclic acetal group, cyclic lactone group, or cyclic thioether group, Spiro orthoester compounds, or the like. Among these, a monomer having an epoxy group, oxetane ring or vinyl ether group is particularly preferred.

Examples of the cationic polymerizable monomer having an epoxy group may include an aromatic compound having a hydroxyl group, a glycidyl ether compound which is a chain type compound, a glycidylamino compound having an amino group, an alicyclic epoxy compound having a glycidyloxy group or epoxyethyl group attached through alkylene or directly to a saturated carbon ring, or the like. Among these, the alicyclic epoxy compound is preferably used in view of excellent cationic polymerizability.

Examples of the glycidyl ether compound may include phenyl glycidyl ether, ethylene glycol diglycidyl ether, glycerin diglycidyl ether, trimethylol propane triglycidyl ether, dicyclopentadiene dimethanol diglycidyl ether, bisphenol A type diglycidyl ether, bisphenol F type diglycidyl ether, bisphenol S type diglycidyl ether, bisphenol AD type diglycidyl ether, glycidyl ether compound of 3,3',5,5'-tetramethyl-4,4'-biphenol. Among these, trimethylol propane triglycidyl ether, dicyclopentadiene dimethanol diglycidyl ether, bisphenol A type diglycidyl ether or hydrogenated bisphenol A type diglycidyl ether are preferably used.

In addition, various polycyclic aromatic glycidyl ether compounds including glycidyl ether compounds of phenol novolac resin, glycidyl ether compounds of cresol novolac resin, glycidyl ether compounds of phenolaralkyl resin, glycidyl ether compounds of naphtholaralkyl resin, glycidyl ether compounds of phenol dicyclopentadiene resin, or the like may be used.

Moreover, alkylene glycol type glycidyl ether compounds such as glycidyl ether compounds of ethylene glycol, glycidyl ether compounds of diethylene glycol, glycidyl ether compounds of 1,4-butanediol, glycidyl ether compounds of 1,6-hexanediol, or the like may be used.

In addition, glycidylamino compounds such as glycidylamino compounds of 1,3-phenylene diamine, glycidylamino compounds of 1,4-phenylenediamine, glycidylamino compounds and glycidyl ether compounds of 3-aminophenol, glycidylamino compounds and glycidyl ether compounds of 4-aminophenol or the like may also be used.

Furthermore, vinylcyclohexene monooxide, vinylcyclohexene dioxide, limonene dioxide, 1,2:8,9-diepoxy limonene, 3,4-epoxycyclohexylmethyl-3',4'-epoxycyclohexane carboxylate, 3,4-epoxycyclohexenylmethyl-3,4'-epoxycyclohexene carboxylate, bis-(6-methyl-3,4-epoxycyclohexyl) adipate, 2-(3,4-epoxycyclohexyl)ethyl trimethoxysilane, or the like may be usable. Among these, vinylcyclohexene monooxide, 1,2:8,9-diepoxy limonene, or 3,4-epoxycyclohexenylmethyl-3,4'-epoxycyclohexene carboxylate are preferred in view of availability and handling properties.

Examples of the cationic polymerizable monomer having a vinyl ether group may include diethylene glycol divinyl ether, triethylene glycol divinyl ether, cyclohexyl vinyl ether, polyethylene glycol divinyl ether, 1,4-cyclohexane dimethanol divinyl ether, and the like. Among these, triethylene glycol divinyl ether and cyclohexyl vinyl ether are preferred in view of availability and handling properties.

The above cationic polymerizable monomers having a vinyl ether group or an epoxy group may be commercially available products. Examples of the commercially available cationic polymerizable monomers may include EPOLITE® series (Kyoeisha Kagaku Co. Ltd.), EPIKOTE® Series (Mitsubishi Chemical Co. Ltd.), EPICLON® Series (DIC Co. Ltd.), Epotot® Series (Doto Kasei Co. Ltd.), Adeka Resin® Series (ADEKA Co. Ltd.), Denacol® Series (Nagase Chemdex Corp.), Dow epoxy Series (Dow Chemical Japan Co. Ltd.), Tepic® Series (Nissan Kagaku Kogyo Co. Ltd.), DVE-3, CHVE (BASF JAPAN Co. Ltd.), Celloxide® Series (Daicel Co. Ltd.), and the like.

Examples of the compounds having an oxetane ring as the cationic polymerizable monomer may include 2-ethylhexyl oxetane, xylylene bisoxetane, 3-ethyl-3-hydroxymethyl oxetane, 1,4-bis[(3-ethyloxetane-3-yl)methoxymethyl]benzene, 3-ethyl-3-(2-ethylhexyloxymethyl)oxetane, bis(3-ethyl-3-oxetanylmethyl)ether, 3-ethyl-3-(phenoxymethyl) oxetane, 3-ethyl-3-(cyclohexyloxymethyl)oxetane, phenol novolac oxetane, 1,3-bis[(3-ethyloxetane-3-yl)methoxy] benzene, and the like. Among these, 2-ethylhexyloxetane and xylylene bisoxetane are specifically preferred in view of availability and handling properties.

The oxetane compounds are commercially available products. Examples of the oxetane compounds may include Aron Oxetane® Series (Toagosei Co. Ltd.), ETERNACOLL® Series (Ube Industries Ltd.), and the like.

The cationic polymerizable monomer may be used alone or in combination of two or more thereof.

The cationic polymerizable monomer may be present in an amount of 20 parts by weight to 60.9 parts by weight based on 100 parts by total weight of the (A) radical polymerizable monomer, (B) cationic polymerizable monomer and (C) unsaturated dicarboxylic acid anhydride. Within this range, adhesion is sufficient and curing inhibition due to moisture can be prevented. In one embodiment, the cationic polymerizable monomer may be present in an amount of 42 parts by weight to 57 parts by weight, preferably 45 parts by weight to 55 parts by weight based on 100 parts by total weight of the (A) radical polymerizable monomer, (B) cationic polymerizable monomer and (C) unsaturated dicarboxylic acid anhydride.

The weight ratio of the (A) radical polymerizable monomer to the (B) cationic polymerizable monomer ((A):(B)) may preferably 57:43 to 43:57, more preferably 55:45 to 45:55, still more preferably 50:50.

(C) Unsaturated Dicarboxylic Acid Anhydride

Any unsaturated dicarboxylic acid anhydride may be used without limitation as long as the unsaturated dicarboxylic acid anhydride can react with the radical polymerizable monomer to form a copolymer and is hydrolyzable.

More specifically, examples of the unsaturated dicarboxylic acid anhydride may include maleic anhydride, itaconic anhydride, ethylmaleic anhydride, methylitaconic anhydride, chloromaleic anhydride, or the like. Among these, in view of availability and handling properties, maleic anhydride and itaconic anhydride are preferably used, and maleic anhydride is more preferably used. These unsaturated dicarboxylic acid anhydrides may be used alone or in combination with two or more thereof.

The unsaturated dicarboxylic acid anhydride may be present in an amount of 0.2 parts by weight to 13 parts by weight based on 100 parts by total weight of the (A) radical polymerizable monomer, (B) cationic polymerizable monomer and (C) unsaturated dicarboxylic acid anhydride. Within this range, curing inhibition due to moisture may be sufficiently prevented, and the protective film or polarizer is not adversely affected since a suitable number of carboxylic groups are present in the adhesive. Preferably, the unsaturated dicarboxylic acid anhydride may present in an amount of 0.8 parts by weight to 8 parts by weight based on 100 parts by total weight of the (A) radical polymerizable monomer, (B) cationic polymerizable monomer and (C) unsaturated dicarboxylic acid anhydride.

(D) Initiator

The (D) initiator in the present invention may include (D1) a radical polymerization initiator, (D2) a cationic polymerization initiator, or mixtures thereof.

The (D) initiator may be present in an amount of 0.5 parts by weight to 10 parts by weight based on 100 parts by total weight of (A), (B) and (C).

(D1) Radical Polymerization Initiator

The radical polymerization initiator is not particularly limited, and any radical polymerization initiators well-known in the art may be used. Specifically, examples of the radical polymerization initiator may include inorganic peroxides such as hydrogen peroxide, potassium persulfate, ammonium persulfate, or the like, organic peroxides such as t-butyl hydroperoxide, t-dibutyl peroxide, cumene hydroperoxide, acetyl peroxide, benzoyl peroxide, lauroyl peroxide, or the like, azo compounds such as azobisisobutyronitrile, azobis-2,4-dimethyl valeronitrile, azobiscyclohexane carbonitrile, azobisisobutyric acid methyl, azobisisobutylamidine hydrochloride, azobiscyanovaleric acid, or the like, acetophenones, benzoins, benzophenones, phosphine oxides, ketals, anthraquinones, thioxanthones, 2,3-dialkyldione compounds, disulfide compounds, fluoroamine compounds, aromatic sulfoniums, Ropin dimers, onium salts, borate salts, active esters, active halogens, inorganic complexes, coumarines, or the like.

More specifically, examples of the radical polymerization initiator may include acetophenones such as acetophenone, 3-methylacetophenone, benzyldimethylketal, 1-(4-isopropylphenyl)-2-hydroxy-2-methylpropane-1-one, 2-methyl-1-[4-(methylthio)phenyl]-2-morpholinopropane-1-one, 2-hydroxy-2-methyl-1-phenyl propane-1-one, or the like; benzophenones such as benzophenone, 4-chlorobenzophenone, 4,4'-diamino benzophenone, or the like; benzoin ethers such as benzoin propylether, benzoin ethylether, or the like; thioxanthones such as 4-isopropylthioxanthone; xanthone, fluorenone, camphorquinone, benzaldehyde, anthraquinone, or the like. These may be used alone or in combination of two or more thereof.

The radical polymerization initiator may be commercially available products. Examples of the radical polymerization initiator may include IRGACURE®-184, 819, 907, 651, 1700, 1800, 819, 369, 261, DAROCUR-TPO (BASF JAPAN Co. Ltd.), DAROCUR®-1173 (Merck Co. Ltd.), Esacure-KIP150, TZT (DKSH JAPAN Co. Ltd.), Kayacure® BMS, DMBI (Nihon Kayaku K.K), or the like.

The inorganic peroxide and organic peroxide may be used in combination with amines such as ethylamine, triethanolamine, dimethylaniline, or the like; polyamine; divalent iron salt compounds; ammonia; organic metal compounds such as triethylaluminium, triethylboron, diethylzinc, or the like; suitable reducing agents such as sodium sulfite, sodium hydrogen sulfite, cobalt naphthenate, sulfinic acid, mercaptan, or the like.

The radical polymerization initiator may be present in an amount of 0.5 parts by weight to 5 parts by weight based on 100 parts by total weight of the (A) radical polymerizable monomer, (B) cationic polymerizable monomer and (C) unsaturated dicarboxylic acid anhydride. Within this range, peeling does not occur during durability testing. In one embodiment, the radical polymerization initiator may be present in an amount of 0.5 parts by weight to 2.5 parts by weight based on 100 parts by total weight of the (A) radical polymerizable monomer, (B) cationic polymerizable monomer and (C) unsaturated dicarboxylic acid anhydride.

(D2) Cationic Polymerization Initiator

As a cationic polymerization initiator, any compounds commonly used as a mineral acid generating agent may be used without limitation. Specifically, examples of the cationic polymerization initiator may include onium salts such as aromatic diazonium salts, aromatic iodonium salts, aromatic sulfonium salts, or the like, iron-arene complex or the like. These may be used alone or in combination of two or more thereof.

Examples of the aromatic diazonium salts may include benzene diazonium hexafluoroantimonate, benzene diazonium hexafluorophosphate, benzenediazonium hexafluoroborate, or the like.

Examples of the aromatic iodonium salt may include diphenyl iodonium tetrakis(pentafluorophenyl)borate, diphenyl iodonium hexafluorophosphate, diphenyl iodonium hexafluoroantimonate, di(4-nonylphenyl)iodonium hexafluorophosphate, or the like.

Examples of the aromatic sulfonium salt may include triphenyl sulfonium hexafluorophosphate, triphenyl sulfonium hexafluoroantimonate, triphenyl sulfonium tetrakis(pentafluorophenyl)borate, diphenyl[4-(phenylthio)phenyl]sulfonium hexafluoroantimonate, 4,4'-bis[diphenylsulfonio]diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenylsulfide hexafluoroantimonate, 4-(p-tert-butylphenylcarbonyl)-4'-di(p-toluyl)sulfonio-diphenylsulfide tetrakis(pentafluorophenyl)borate, diphenyl[4-(phenylthio)phenyl]sulfonium phosphate, or the like.

Examples of the iron-arene complex may include xylene-cyclopentadienyl iron (II) hexafluoroantimonate, cumene-cyclopentadienyl iron (II) hexafluorophosphate, xylene-cyclopentadienyl iron (II)-tris(trifluoromethylsulfonyl)methanide, or the like.

The cationic polymerization initiator may be commercially available products, and examples of the cationic polymerization initiator may include CPI-100P, 101A, 200K, 210S (SAN-APRO Co. Ltd.), Kayarad® PCI-220, PCI-620 (Nihon Kayaku Co. Ltd.), UVI-6990 (Union Carbide Co. Ltd.), Adekaoptomer SP-150, SP-170 (ADEKA Co. Ltd.), CI-5102 (Nihon Soda Co. Ltd.), CIT-1370, 1682 (Nihon Soda Co. Ltd.), CIP-1866S, 2048S, 2064S (Nihon Soda Co. Ltd.), DPI-101, 102, 103, 105 (Midori Kagaku Co. Ltd.), MPI-103, 105 (Midori Kagaku Co. Ltd.), BBI-101, 102, 103, 105 (Midori Kagaku Co. Ltd.), TPS-101, 102, 103, 105 (Midori Kagaku Co. Ltd.), MDS-103, 105 (Midori Kagaku Co. Ltd.), DTS-102, 103 (Midori Kagaku Co. Ltd.), PI-2074 (Rodia Japan Co. Ltd.), or the like.

The cationic polymerization initiator may be present in an amount of 0.5 parts by weight to 5 parts by weight based on 100 parts by total weight of the (A) radical polymerizable monomer, (B) cationic polymerizable monomer and (C) unsaturated dicarboxylic acid anhydride. Within this range, curing properties after ultraviolet irradiation are good, and peeling does not occur during durability testing. In one embodiment, the cationic polymerization initiator may be present in an amount of 1 part by weight to 4 parts by weight based on 100 parts by total weight of the (A) radical polymerizable monomer, (B) cationic polymerizable monomer and (C) unsaturated dicarboxylic acid anhydride.

(E) Photosensitizer

The adhesive composition of the present invention may further include a photosensitizer. In one embodiment, in the case of using the photosensitizer, since radical polymerization is also performed, the adhesive composition may not include the radical polymerization initiator. In addition, the photosensitizer may improve cationic polymerization reactivity, mechanical strength and adhesion of the adhesive composition.

Examples of the photosensitizer may include carbonyl compounds, organic sulfur compounds, persulfides, redox compounds, azo and diazo compounds, halogen compounds, photoreductive colorants, or the like. More specifically, examples of the photosensitizer include benzoin derivatives such as benzoin methyl ether, benzoin isopropyl ether, $\alpha,\alpha$-dimethoxy-$\alpha$-phenyl acetophenone, or the like; benzophenone derivatives such as benzophenone, 2,4-dichlorobenzophenone, o-benzoylbenzoic acid methyl, 4,4'-bis(dimethylamino)benzophenone, 4,4'-bis(diethylamino)benzophenone, or the like; thioxanthone derivative such as 2-chlorothioxanthone, 2-isopropyl thioxanthone, or the like; anthraquinone derivatives such as 2-chloroanthraquinone, 2-methyl anthraquinone, or the like; acridone derivatives such as N-methylacridone, N-butylacridone, or the like; and $\alpha,\alpha$-diethoxy acetophenone, benzyl, fluorenone, xanthone, uranyl compounds, or halogen compounds.

The photosensitizer may be present in an amount of 0.1 parts by weight to 5 parts by weight, more preferably 0.5 parts by weight to 2 parts by weight based on 100 parts by total weight of the (A) radical polymerizable monomer, (B) cationic polymerizable monomer and (C) unsaturated dicarboxylic acid anhydride.

Method of Preparing an Adhesive Composition

The method of preparing an adhesive composition is not particularly limited, and generally, the radical polymerizable monomer, cationic polymerizable monomer, unsaturated dicarboxylic acid anhydride, radical polymerization initiator, and cationic polymerization initiator are mixed to obtain an adhesive composition. In order to adjust viscosity, a suitable organic solvent may be used. The mixing method is not particularly limited, and the components are mixed while sufficiently stirring until a uniform liquid mixture is obtained at room temperature (25° C.).

In addition, the adhesive composition for polarizing plates may further include ultraviolet absorbers, antioxidants, heat stabilizers, silane coupling agents, inorganic fillers, softening agents, antioxidants, anti-aging agents, stabilizers, tackifiers, modifying resins (polyol resin, phenol resin, acryl resin, polyester resin, polyolefin resin, epoxy resin, epoxidized polybutadiene resin, or the like), leveling agents, antifoaming agents, plasticizers, dyes, pigments (coloring pigments, sieving pigments, or the like), treating agents, ultraviolet blocking agents, fluorescent brighteners, dispersing agents, light stabilizers, antistatic agents, lubricants, or the like, as needed.

Polarizing Plate

Another aspect of the present invention relates to a polarizing plate including a protective film and a polarizer attached to each other via the adhesive composition. Since curing inhibition of the adhesive composition due to moisture is prevented, the polarizing plate of the present invention exhibits sufficient adhesion even in the case where the polarizing plate is prepared under high humidity conditions.

(a) Polarizer

The polarizer is not particularly limited and any polarizer well known in the art may be used. Examples of the polarizer may include a polarizer prepared by adsorbing a dichroic material such as iodine or a dichroic dye to a hydrophilic polymer film, such as a polyvinyl alcohol film, partially formalized polyvinyl alcohol film, ethylene.vinyl acetate copolymer-based partially saponified film, or the like, followed by uniaxial stretching, or a polyene oriented film, such as a dehydrated material of polyvinyl alcohol or a dehydrochlorinated material of polyvinyl chloride, or the like.

Among these, a polarizer prepared by dyeing a polyvinyl alcohol film having an average degree of polymerization of 2000 to 2800 and a degree of saponification of 90 mol % to 100 mol % with iodine, followed by uniaxial stretching by 5 times to 6 times is preferred. More specifically, such a polarizer is obtained, for example, by immersing and dyeing a polyvinyl alcohol film in an aqueous solution of iodine. Preferably, an aqueous solution in which 0.1 wt % to 1.0 wt % of iodine/potassium iodide is dissolved is used as an aqueous solution of iodine. The polyvinyl alcohol film may be dipped in an aqueous solution of boric acid or potassium iodide at 50° C. to 70° C., as needed. Further, in order to prevent separate washing operation or dye spots, the polyvinyl alcohol film may be dipped in water at 25° C. to 35° C. Stretching may be performed after dyeing with iodine, or may be performed together with dyeing. Alternatively, dyeing may be performed after stretching. After completion of dyeing and stretching, the resultant is washed with water and dried at 35° C. to 55° C. for 1 minute to 10 minutes.

(b) Protective Film

As a protective film, a material having good transparency, mechanical strength, thermal stability, moisture blocking properties, isotropic properties, and the like is preferably used. Examples of materials for the protective film may include cellulose resins, such as cellulose diacetate, cellulose triacetate, or the like; polyester resins, such as polyethylene terephthalate, polyethylene naphthalate, and the like; acrylic resins such as polymethyl methacrylate or the like; styrene resins, such as polystyrene, acrylonitrile.styrene copolymer (AS resin), or the like; polycarbonate resin; polyolefin resins such as polyethylene, polypropylene, polyolefins having a cyclo- or norbornene-structure, ethylene.propylene copolymers, or the like; vinyl chloride; amide resins, such as nylon, aromatic polyamide, or the like; imide resins; sulfone resins; polyether sulfone resins; polyetheretherketone resins; polyphenylene sulfide resins; vinylalcohol resins; vinylidene chloride resins; vinylbutyral resins; allylate resins; polyoxymethylene resins; epoxy resins; or blends thereof.

Among these, a cellulose resin which is an ester of cellulose and a fatty acid, a cycloolefin polymer (COP film) or polyethylene terephthalate (PET film) are preferred as a protective film for polarizing plates. Examples of the cellulose resin may include cellulose triacetate, cellulose diacetate, cellulose tripropionate, cellulose dipropionate, or the like. Among these, cellulose triacetate (TAC film), polyethylene terephthalate, and cycloolefin polymers are particularly preferred in view of commercial availability and cost. Although saponified cellulose triacetate can be used, non-saponified cellulose triacetate is more preferred. Examples of the cycloolefin polymers may include polymers containing, as a constitutional component, a polymer obtained by hydrogenation of an open-chain polymer such as tetracyclododecene disclosed in Japanese Patent Publication No. H2-9619.

Examples of commercially available TAC films may include UV-50, UV-80, SH-80, TD-80U, TD-TAC, UZ-TAC (all manufactured by Fuji film Co. Ltd.), KC Series (Konica-Minolta Opto Co. Ltd.), and the like. Examples of commercially available COP films may include Aton® (JSR Co. Ltd.), ZEONEX® Series, ZEONOR® Series (Nipponzeon Co. Ltd.), and the like. Examples of commercially available PET film may include COSMOSHINE® Series (TOYOBO Co. Ltd.).

Preferably, the surface of the protective film is modified by corona discharge treatment. Any type of corona discharge treatment known in the art may be performed using a typical corona discharge device (for example, manufactured by Gasga Denki Co. Ltd.). By corona discharge treatment, an active group, for example, a hydroxyl group may be formed on the surface of the protective film. It is believed that such an active group is hydrogen bonded with a carboxylic group generated by hydrolysis of maleic anhydride in the adhesive composition of the present invention, which attributes to improvement of adhesion. In case of the saponified cellulose triacetate is used as the protective film, may be expected to enhancing adhesion like as corona discharge treatment, thus the corona discharge treatment is not obligatorily required. However, considering the fact that saponification includes complex processes and high cost, it is preferred in the preparation process that cellulose triacetate obtained by subjecting non-saponifed cellulose triacetate to corona discharge treatment is used.

The discharged quantity during corona treatment is not particularly limited, but is preferably 30 W·min/m² to 300 W·min/m², more preferably 50 W·min/m² to 250 W·min/m². Within this range, adhesion between the protective film and the adhesive can be improved without heat deteriorating the protective film itself. Herein, the discharged quantity refers to a work amount with respect to an object by corona discharge, as calculated by the following equation. Based on this equation, corona discharge power can be determined.

(Discharge quantity)=(discharge power)÷{(treatment rate for subject)×(length of electrode)}

(c) Method of Preparing Polarizing Plate

The method of preparing a polarizing plate is not particularly limited, and generally, the polarizing plate may be prepared by attaching a protective film and a polarizer using the adhesive composition according to the present invention. The applied adhesive composition may exert adhesive properties upon ultraviolet irradiation, thereby forming an adhesive layer.

The adhesive composition may be applied to either a protective film or a polarizer, or may be applied to both. The adhesive composition may be applied thereto such that the adhesive layer has a thickness of 10 nm to 300 nm after drying. More preferably, the adhesive layer has a thickness of 10 nm to 200 nm to ensure a uniform thickness in the surface and sufficient adhesion. The thickness of the adhesive layer may be adjusted by solid concentration in the adhesive composition solution or by a device used for application of the adhesive composition. Further, the thickness of the adhesive layer may be determined by observing a cross-section thereof via scanning electron microscopy (SEM). The method of coating the adhesive composition is not particularly limited, and the adhesive composition may be coated by various methods, such as direct dripping, roll coating, spraying, dipping, and the like.

After coating the adhesive composition, the polarizer and the protective film may be attached to each other by a roll laminator or the like.

After attachment, ultraviolet light is irradiated to the polarizing plate to cure the adhesive composition. Although there is no limitation as to a light source for ultraviolet illumination, a low pressure mercury lamp, medium pressure mercury lamp, high pressure mercury lamp, ultra-high pressure mercury lamp, chemical lamp, backlight, microwave excitation mercury lamp, metal halide lamp, and the like, which have a luminescent distribution at a wavelength of 400 nm or less, are utilizable. Although the intensity of ultraviolet irradiation is not particularly limited, ultraviolet irradiation dose in the wavelength range effective in activation of the polymerization initiator may range from 100 mJ/cm$^2$ to 1000 mJ/cm$^2$. Within this range, a suitable reaction time can be obtained, and there is no risk of causing deterioration of the adhesive itself or polarized film due to heat irradiated from a lamp and heat generated upon polymerization.

After ultraviolet irradiation, since the cationic polymerizable monomer resin is subjected to dark reaction, the polarizing plate is left at room temperature (25° C.) for 16 hours to 20 hours. Upon completion of curing, the polarizing plate is finished.

EXAMPLES

Hereinafter, the present invention will be explained in more detail with reference to the following examples and comparative examples. These examples are provided for illustration only and are not to be in any way construed as limiting the present invention.

Example 1

Preparation of Adhesive Composition 25 parts by weight of 4-hydroxybutylacrylate (manufactured by Nihon Kasei Co. Ltd.) as a radical polymerizable monomer, 10 parts by weight of acrylic acid tetrahydrofurfuryl (manufactured by Tokyo Kasei Kogyo Co. Ltd.), 12 parts by weight of isobornyl acrylate (manufactured by Tokyo Kasei Kogyo Co. Ltd.), 3 parts by weight of urethane acrylate (NK OLIGO® U-4HA, Shinnakamura Kagaku Kogyo Co. Ltd.), 47 parts by weight of bisphenol A glycidyl ether (EPIKOTE® 828, Mitsubishi Chemical Co. Ltd.) as a cationic polymerizable monomer, 3 parts by weight of maleic anhydride, 1 part by weight of a radical polymerization initiator (IRGACURE® 819, BASF JAPAN Co. Ltd.), 4 parts by weight of 50%-triaryl sulfonium salt/propylene carbonate (CPI-101A, SAN-APRO Co. Ltd.) as a cationic polymerization initiator were mixed by stirring in a thermostatic chamber at 23° C. and 50% humidity until the mixture became visibly uniform, thereby preparing an adhesive composition. The components used and formulation ratio are summarized in Table 1.

<Preparation of Polarizing Plate>

A polarizer was prepared by the following method. A polyvinyl alcohol film having an average degree of polymerization of 2400, a saponification degree of 99.9% and a thickness of 75 μm was swollen by dipping the polyvinyl alcohol film in hot water at 28° C. for 90 seconds. Then, the swollen polyvinyl alcohol film was dipped in an aqueous solution at a concentration of 0.6 wt % of iodine/potassium iodide (weight ratio 2/3), followed by dyeing while stretching by a stretch ratio of 2.1 times. Thereafter, the polyvinyl alcohol film was stretched in a boric acid ester aqueous solution at 60° C. by a stretch ratio of 5.8 times, washed with water, and dried at 45° C. for 3 minutes, thereby preparing a polarizer (thickness: 25 μm).

As shown in FIG. 1, the polarizer was interposed between two protective films and the adhesive composition prepared as above was dripped between the protective film and polarizer using a spoid, followed by attachment by a roll press. As the protective film, a combination of a cellulose triacetate film (TAC film, manufactured by Fuji film Co. Ltd., thickness: 80 μm) and a COP film (manufactured by Nipponzeon Co. Ltd., thickness: 30 μm) or a combination of the cellulose triacetate film and a polyethylene terephthalate film (PET film, TOYOBO Co. Ltd., thickness: 100 μm) was used. The attached polarizing plate before curing was exposed to UV light at an intensity of 500 m J/cm$^2$ (365 nm metal halide lamp) from the protective film (1) side.

In addition, in order to evaluate the effect of environmental humidity, both attachment of the polarizer and the protective film by the adhesive composition and ultraviolet irradiation were performed in a room capable of adjusting temperature and humidity under conditions of 23° C. and 25% RH, 23° C. and 55% RH or 23° C. and 70% RH, thereby preparing polarizing plates.

After UV irradiation, each polarizing plate was left in a thermostatic chamber at 23° C. and 50% RH for a night and the adhesive composition was cured to complete polarizing plates.

The obtained polarizing plates were evaluated by curability test, forced peeling testing, cutting testing, hot water dipping testing, optical properties test, durability testing, and heat shock testing. Results are summarized in Table 3.

Examples 2~7

Adhesive compositions were prepared in the same manner as in Example 1 except that the components and formulation amounts as listed in Table 1 were used. Polarizing plates were prepared in the same manner as in Example 1 except that the protective film 1 and the protective film 2 in Tables 3 and 4, and the adhesive compositions obtained from the above were used under conditions listed in Tables 3 and 4, followed by UV irradiation. The polarizing plates prepared in Examples 2~7 were evaluated by the same tests as in Example 1.

Comparative Examples 1~6

Adhesive compositions were prepared in the same manner as in Example 1 except that the components and formulation amounts as listed in Table 2 were used. Polarizing plates were prepared in the same manner as in Example 1 except that the protective film (1) and protective film (2) in Tables 5 and 6, and the adhesive compositions obtained from the above were used under conditions listed in Tables 5 and 6, followed by UV irradiation. The polarizing plates prepared in Comparative Examples 1~6 were evaluated by the same tests as in Example 1.

<Curability Test>

The adhesive compositions prepared in Examples 1~7 and Comparative Examples 1~6 were attached to PET films instead of the protective film (1) and protective film (2) in the same manner as the method of preparing the polarizing plate. To these specimens, ultraviolet light was irradiated under the same conditions for producing the polarizing plate, and the surface state after 1 minute and 1 week of irradiation was checked with fingers.

Test results were evaluated according to the following standard.

○: The surface did not have fingerprints thereon.

Δ: The surface had fingerprints thereon.

X: The surface was not cured and maintained in a liquid phase.

<Forced Peeling Testing>

One side of the protective film 1 or protective film 2 of the polarizing plates prepared in Examples 1~7 and Comparative Examples 1~6 was cut in half (half cut) with a knife, as shown in FIG. 2. Subsequently, the polarizing plate was modified so that the half cut portion was bent and became convex. The state of the protective film 1 or protective film 2 at the bent portion of the polarizing plate was visually observed. Test results were evaluated according to the following standard.

◎: No peeling

○: less than 0.5 mm

X: 0.5 mm or more

<Cutting Testing>

The polarizing plates prepared in Examples 1~7 and Comparative Examples 1~6 were cut into a size of 50 mm×50 mm using a Thomson blade, and the peeled state of one end of each polarizing plate upon cutting was visually observed. Test results were evaluated according to the following standard.

◎: No peeling

○: less than 0.5 mm

X: 0.5 mm or more

<Hot Water Dipping Testing>

The polarizing plates prepared in Examples 1~7 and Comparative Examples 1~6 were cut to a size of 50 mm×50 mm using a Thomson blade and then were dipped in a water bath at 60° C. and maintained for 3 hours. Then, samples were removed from the water bath, and dried by wiping moisture. Each sample was visually observed as to whether iodine was melted from a portion of the polarizer contacting hot water to cause the color from come out from the sample due to dipping in hot water. Test results were evaluated according to the following standard.

○: No change

X: Color came out

<Optical Properties>

The polarizing plates prepared in Examples 1~7 and Comparative Examples 1~6 were examined to measure transmittance and haze using a Hazemeter (HazeMeter NDH5000W, Nippon Denshoku Kogyo Co. Ltd.). A polarizing plate having a transmittance of 43% or more and haze of less than 0.5% is deemed appropriate for actual use.

<Durability Testing>

The polarizing plates prepared in Examples 1~7 and Comparative Examples 1~6 were cut into a size of 50 mm×50 mm using a Thomson blade and then were left for 500 hours under conditions of 85° C./95% RH and 60° C./95% RH. The samples were observed and examined to measure transmittance and haze in the same manner as optical properties. Test results were evaluated according to the following standard.

○: No peeling at film end. Difference of Transmittance and haze from those before durability testing was less than 3%.

X: Peeling was found at film end. Difference of Transmittance and haze from those before the durability testing was not less than 3%.

<Heat Shock Testing (Polarizer Crack)>

The polarizing plates prepared in Examples 1~7 and Comparative Examples 1~6 were cut into a size of 50 mm×50 mm using a Thomson blade to prepare specimens. As shown in FIG. 3(a), the specimens were attached to an SUS plate abraded with waterproof abrasive paper (#280) using Aronalpha® General (Toagosei Co. Ltd.) and aged at 25° C. for 24 hours. The aged specimens were subjected to heat shock testing.

Heat shock testing was performed by leaving the specimens at 85° C. for 1 hour and −40° C. for 1 hour, which was repeated 30 cycles. After the heat shock testing, as shown in FIG. 3(b), the specimens were observed as to whether there existed polarizer cracking from the end of the polarizing plate in the stretched direction of the polarizer. When polarizer cracking was observed, the crack length was measured. In the case that multiple cracks were observed, an average length was obtained. Test results were evaluated according to the following standard.

◎: No crack in the polarizer.

○: Less than 0.5 mm

X: 0.5 mm or more

TABLE 1

| | | Example | | | | | | |
|---|---|---|---|---|---|---|---|---|
| | | 1 | 2 | 3 | 4 | 5 | 6 | 7 |
| A | 4HBA | 25 | 54.5 | — | 17 | 13 | — | 20 |
| | HEAA | — | — | — | — | — | — | — |
| | THFA | 10 | — | — | 9 | 18 | — | — |
| | IBOA | 12 | — | — | 14 | 12 | — | — |
| | ACMO | — | — | 44 | — | — | 10 | — |
| | DA-141 | — | — | 6 | — | — | — | — |
| | U-4HA | 3 | — | — | — | — | — | 5 |
| | M-220 | — | — | — | — | 5 | — | 8 |
| | M-5300 | — | 20 | — | — | — | 10 | — |
| | VEEA | — | — | — | 5 | — | — | 5 |
| | EOXTVE | — | — | — | — | — | 10 | — |
| B | EPOLITE 100MF | — | — | — | 20 | — | — | — |
| | EPIKOTE 828 | 47 | — | — | 10 | — | 35 | 40 |
| | EX-252 | — | — | — | — | 10 | — | — |
| | Celloxide2000 | — | — | 29 | — | — | — | — |
| | Celloxide3000 | — | — | — | — | — | — | — |
| | Celloxide2021P | — | 25 | — | — | 40 | — | — |
| | EP-4088S | — | — | 20 | — | — | — | — |
| | OXT-212 | — | — | — | — | — | 10 | 15 |
| | OXT-121 | — | — | — | 5 | — | — | — |
| | DVE-3 | — | — | — | 15 | — | — | — |
| | CHVE | — | — | — | — | — | 15 | — |
| C | MAH | 3 | 0.5 | 1 | — | 2 | 10 | 7 |
| | ITA | — | — | — | 5 | — | — | — |
| G | MA | — | — | — | — | — | — | — |
| D1 | IRGACURE 819 | 1 | — | 0.9 | 1 | 1 | — | — |
| | DAROCUR TPO | — | 1 | — | — | — | — | 2 |
| D2 | CPI-210S | — | 2 | 1 | 1.5 | 1 | 3 | — |
| | CPI-101A | 4 | — | — | — | — | — | 1 |
| E | UVS-1331 | — | — | — | — | — | 1 | — |

TABLE 2

| | | Comparative Example | | | | | |
|---|---|---|---|---|---|---|---|
| | | 1 | 2 | 3 | 4 | 5 | 6 |
| A | 4HBA | 55 | — | — | — | 27 | 20 |
| | HEAA | — | — | — | 25 | — | — |
| | THFA | — | — | — | — | 13 | — |
| | IBOA | — | — | — | — | 8 | — |
| | ACMO | — | 84 | — | 15 | — | 5 |
| | DA-141 | — | 11 | — | — | — | — |
| | U-4HA | — | — | — | — | — | — |
| | M-220 | — | — | — | 10 | — | 8 |
| | M-5300 | 20 | — | — | — | — | — |
| | VEEA | — | — | — | — | — | 5 |
| | EOXTVE | — | — | — | — | — | — |
| B | EPOLITE 100MF | — | — | — | — | — | — |
| | EPIKOTE 828 | — | — | — | — | — | 10 |
| | EX-252 | — | — | 19 | — | — | — |
| | Celloxide2000 | — | — | — | 29.9 | — | — |
| | Celloxide3000 | — | — | — | — | — | — |
| | Celloxide2021P | 25 | — | 78 | — | — | 30 |
| | EP-4088S | — | — | — | 20 | 37 | — |
| | OXT-212 | — | — | — | — | — | 15 |
| | OXT-121 | — | — | — | — | — | — |
| | DVE-3 | — | — | — | — | — | — |
| | CHVE | — | — | — | — | — | — |
| C | MAH | — | 5 | 3 | 0.1 | 15 | — |
| | ITA | — | — | — | — | — | — |
| G | MA | — | — | — | — | — | 7 |
| D1 | IRGACURE 819 | — | 1.5 | — | 0.9 | 1 | — |
| | DAROCUR TPO | 1 | — | — | — | — | 1 |
| D2 | CPI-210S | 2 | — | 1.8 | 1 | 1 | 1 |
| | CPI-101A | — | — | — | — | — | — |
| E | UVS-1331 | — | — | — | — | — | — |

A: Radical polymerizable monomer;
B: Cationic polymerizable monomer;
C: Unsaturated dicarboxylic acid anhydride;
D1: Radical polymerization initiator;
D2: Cationic polymerization initiator;
E: Photosensitizer;
G: Others 4HBA: 4-hydroxy butyl acrylate (manufactured by Nihon Kasei Co. Ltd.)
HEAA: N-(2-hydroxyethyl) acrylamide (manufactured by Kojin Co. Ltd.)
THFA: Tetrahydrofurfuryl acrylate (manufactured by Tokyo Kasei Kogyo Co. Ltd.)
IBOA: Isobornyl acrylate (manufactured by Tokyo Kasei Kogyo Co. Ltd.)
ACMO: Acrylomorpholine (manufactured by Kojin Co. Ltd.)
DA-141: Denacol Acrylate DA-314, 2-hydroxy-3-phenoxypropylacrylate (manufactured by Nagase Chemdex Corp.)
U-4HA: NK oligo U-4HA, urethane acrylate (manufactured by Shinnakamura Kagaku Kogyo Co. Ltd.)
M-220: Aronix M-220, Polypropylene glycol diacrylate (Manufactured by Toagosei Co. Ltd.)
M-5300: Aronix M-5300, ω-Carboxy-polycaprolactone monoacrylate (Manufactured by Toagosei Co. Ltd.)
EPOLITE 100MF: Trimethylol propane triglycidyl ether (Manufactured by Kyoeisha Chemical.)
EPIKOTE 828: Bisphenol A diglycidyl ether (Manufactured by Mitsubishi Chemical Co. Ltd.)
EX-252: Hydrogenated Bisphenol A Diglycidyl Ether (Nagase ChemteX Corporation)
Celloxide 2000: Vinylcyclohexene monoxide (1,2-Epoxy-4-vinylcyclohexane) (manufactured by DAICEL CORPORATION)
Celloxide 3000: 1,2:8,9 diepoxylimonene (manufactured by DAICEL CORPORATION)
Celloxide2021P: 3,4-Epoxycyclohexylmethyl-3,4'-epoxycyclohexane carboxylate (manufactured by DAICEL CORPORATION)
EP-4088S: ADEKA RESIN EP-4088S, dicyclopentadiene dimethanol diglycidyl ether (manufactured by ADEKA Co. Ltd.)
OXT-212: ARON OXETANE OXT-212, 2-ethylhexyl oxetane (manufactured by Toagosei Co. Ltd.)
OXT-121: ARON OXETANE OXT-121, xylylene bisoxetane (manufactured by Toagosei Co. Ltd.)
DVE-3: Triethylene glycol divinyl ether (manufactured by BASF JAPAN Co. Ltd.)
CHVE: Cyclohexylvinyl ether (manufactured by BASF JAPAN Co. Ltd.)
MAH: Maleic anhydride (manufactured by Tokyo Oka Kogyo Co. Ltd.)
ITA: Itaconic acid (manufactured by Sigma-Aldrich Co. Ltd.)
VEEA: 2-(2'-vinyloxy ethoxy)ethyl acrylate (manufactured by Nippon Shokubai Co. Ltd.)
EOXTVE: Ethyloxetane methylvinyl ether (Manufactured by Maruzen Sekiyu Kagaku Co. Ltd.)
IRGACURE 819: Bis (2,4,6-trimethylbenzoyl)-phenylphosphine oxide (manufactured by BASF JAPAN Co. Ltd.)
DAROCUR TPO: 2,4,6-trimethylbenzoyl diphenyl phosphine oxide (manufactured by BASF JAPAN Co. Ltd.)
CPI-210S: Triarylsulfonium salt (manufactured by SAN-APRO Co. Ltd.)
CPI-101A: 50%-triarylsulfonium salt/propylene carbonate (manufactured by SAN-APRO Co. Ltd.)
UVS-1331: ANTHRACURE UVS-1331: 9,10-dibuthoxy anthracene (manufactured by Kawasaki Kasei Kogyo Co. Ltd.)
MA: Maleic acid (manufactured by Tokyo Oka Kogyo Co. Ltd.)

TABLE 3

| | | | Example 1 | | | | | Example 2 | |
|---|---|---|---|---|---|---|---|---|---|
| UV adhesive composition | | | 1 | | | | | 2 | |
| Specimen preparation condition | | | 23° C. 25% RH | | 23° C. 55% RH | | 23° C. 70% RH | 23° C. 50% RH | 23° C. 70% RH |
| Protective film 1 | | | COP | COP | COP | COP | COP | COP | COP |
| Protective film 2 | | | TAC | PET | TAC | PET | TAC | PET | PET |
| Property testing | Curability testing | 1 minute after UV irradiation | ○ | ○ | ○ | ○ | ○ | ○ | ○ |
| | | 1 day after UV irradiation | ○ | ○ | ○ | ○ | ○ | ○ | ○ |
| | Forced peeling testing | Protective film1/Polarizer | ⊚ | ⊚ | ⊚ | ⊚ | ⊚ | ⊚ | ○ |
| | | Protective film2/Polarizer | ○ | ○ | ○ | ○ | ○ | ○ | ○ |
| | Cutting testing | | ⊚ | ⊚ | ⊚ | ⊚ | ⊚ | ⊚ | ○ |
| | Hot water dipping testing | | ○ | ○ | ○ | ○ | ○ | ○ | ○ |
| | Optical properties | Transmittance [%] | 43.2 | 43.4 | 43.1 | 43.3 | 43.0 | 43.2 | 43.3 |
| | | Haze [%] | 0.3 | 0.4 | 0.3 | 0.4 | 0.3 | 0.3 | 0.3 |
| | Durability testing | 85° C. × 500 h | ○ | ○ | ○ | ○ | ○ | ○ | ○ |
| | | 60° C. 95% RH × 500 h | ○ | ○ | ○ | ○ | ○ | ○ | ○ |
| | Heat shock testing | | ⊚ | ⊚ | ⊚ | ⊚ | ⊚ | ⊚ | ○ |

TABLE 4

|  |  |  | Example 3 | | Example 4 | | Example 5 | |
| --- | --- | --- | --- | --- | --- | --- | --- | --- |
| UV adhesive composition | | | 3 | | 4 | | 5 | |
| Specimen preparation condition | | | 23° C. 25% RH | 23° C. 70% RH | 23° C. 45% RH | 23° C. 65% RH | 23° C. 30% RH | 23° C. 65% RH |
| Protective film 1 | | | COP | | COP | | COP | |
| Protective film 2 | | | PET | | TAC | | TAC | |
| Property testing | Curability testing | 1 minute after UV irradiation | ○ | ○ | ○ | ○ | ○ | ○ |
| | | 1 day after UV irradiation | ○ | ○ | ○ | ○ | ○ | ○ |
| | Forced peeling testing | Protective film1/Polarizer | ◎ | ◎ | ◎ | ◎ | ◎ | ◎ |
| | | Protective film2/Polarizer | ○ | ○ | ○ | ○ | ○ | ○ |
| | Cutting testing | | ◎ | ◎ | ◎ | ◎ | ◎ | ◎ |
| | Hot water dipping testing | | ○ | ○ | ○ | ○ | ○ | ○ |
| | Optical properties | Transmittance [%] | 43.8 | 43.2 | 43.2 | 44.0 | 43.5 | 43.6 |
| | | Haze[%] | 0.4 | 0.4 | 0.3 | 0.3 | 0.3 | 0.3 |
| | Durability testing | 85° C. × 500 h | ○ | ○ | ○ | ○ | ○ | ○ |
| | | 60° C. 95% RH × 500 h | ○ | ○ | ○ | ○ | ○ | ○ |
| | Heat shock testing | | ○ | ○ | ○ | ○ | ○ | ○ |

|  |  |  | Example 6 | | Example 7 | |
| --- | --- | --- | --- | --- | --- | --- |
| UV adhesive composition | | | 6 | | 7 | |
| Specimen preparation condition | | | 23° C. 45% RH | 23° C. 65% RH | 23° C. 30% RH | 23° C. 70% RH |
| Protective film 1 | | | COP | | COP | |
| Protective film 2 | | | TAC | | PET | |
| Property testing | Curability testing | 1 minute after UV irradiation | ○ | ○ | ○ | ○ |
| | | 1 day after UV irradiation | ○ | ○ | ○ | ○ |
| | Forced peeling testing | Protective film1/Polarizer | ○ | ○ | ◎ | ◎ |
| | | Protective film2/Polarizer | ○ | ○ | ○ | ○ |
| | Cutting testing | | ○ | ○ | ◎ | ◎ |
| | Hot water dipping testing | | ○ | ○ | ○ | ○ |
| | Optical properties | Transmittance [%] | 43.4 | 43.5 | 43.2 | 43.6 |
| | | Haze[%] | 0.3 | 0.3 | 0.3 | 0.4 |
| | Durability testing | 85° C. × 500 h | ○ | ○ | ○ | ○ |
| | | 60° C. 95% RH × 500 h | ○ | ○ | ○ | ○ |
| | Heat shock testing | | ○ | ○ | ◎ | ◎ |

TABLE 5

|  |  |  | Comparative Example 1 | | | | | | Comparative Example 2 | |
| --- | --- | --- | --- | --- | --- | --- | --- | --- | --- | --- |
| UV adhesive composition | | | 8 | | | | | | 9 | |
| Specimen preparation condition | | | 23° C. 25% RH | | 23° C. 55% RH | | 23° C. 70% RH | | 23° C. 50% RH | 23° C. 70% RH |
| Protective film 1 | | | COP | COP | COP | COP | COP | COP | COP | |
| Protective film 2 | | | TAC | PET | TAC | PET | TAC | PET | TAC | |
| Property testing | Curability testing | 1 minute after UV irradiation | ○ | ○ | Δ | Δ | Δ | Δ | ○ | ○ |
| | | 1 day after UV irradiation | ○ | ○ | ○ | ○ | ○ | ○ | ○ | ○ |
| | Forced peeling testing | Protective film1/Polarizer | ○ | ○ | ○ | ○ | ○ | ○ | X | X |
| | | Protective film2/Polarizer | ○ | ○ | X | X | X | X | X | X |
| | Cutting testing | | ○ | ○ | X | X | X | X | X | X |
| | Hot water immersing test | | ○ | ○ | X | X | X | X | X | X |
| | Optical properties | Transmittance [%] | 43.3 | 43.5 | 43.0 | 44.0 | 43.5 | 43.3 | 43.4 | 43.7 |
| | | Haze [%] | 0.3 | 0.4 | 0.3 | 0.4 | 0.3 | 0.3 | 0.3 | 0.3 |
| | Durability testing | 85° C. × 500 h | ○ | ○ | X | X | X | X | X | X |
| | | 60° C. 95% RH × 500 h | ○ | ○ | X | X | X | X | X | X |
| | Heat shock testing | | ○ | ○ | X | X | X | X | X | X |

TABLE 6

| | | | Comparative Example 3 | | Comparative Example 4 | | Comparative Example 5 | | Comparative Example 6 | |
|---|---|---|---|---|---|---|---|---|---|---|
| UV adhesive composition | | | 10 | | 11 | | 12 | | 13 | |
| Specimen preparation condition | | | 23° C. 25% RH | 23° C. 70% RH | 23° C. 45% RH | 23° C. 65% RH | 23° C. 30% RH | 23° C. 65% RH | 23° C. 45% RH | 23° C. 65% RH |
| Protective film 1 | | | COP | | COP | | COP | | COP | |
| Protective film 2 | | | PET | | TAC | | TAC | | TAC | |
| Property testing | Curability testing | 1 minute after UV irradiation | ○ | Δ | Δ | Δ | ○ | ○ | Δ | Δ |
| | | 1 day after UV irradiation | ○ | ○ | ○ | ○ | ○ | ○ | ○ | ○ |
| | Forced Peeling testing | Protective film1/Polarizer | ○ | X | ○ | ○ | ○ | ○ | ○ | ○ |
| | | Protective film2/Polarizer | ○ | X | X | X | ○ | ○ | ○ | ○ |
| | Cutting testing | | ○ | X | X | X | ○ | ○ | ○ | ○ |
| | Hot water dipping testing | | ○ | X | X | X | ○ | ○ | X | X |
| | Optical properties | Transmittance [%] | 43.9 | 43.6 | 43.3 | 43.2 | 43.4 | 43.5 | 43.2 | 43.1 |
| | | Haze [%] | 0.3 | 0.4 | 0.3 | 0.3 | 0.3 | 0.3 | 0.3 | 0.3 |
| | Durability testing | 85° C. × 500 h | ○ | X | X | X | X | X | ○ | ○ |
| | | 60° C. 95% RH × 500 h | ○ | X | X | X | X | X | X | X |
| | Heat shock testing | | ○ | X | X | X | X | X | X | X |

As shown in Tables 3~6, Examples 1~7 demonstrated that the polarizing plates prepared under any temperature and humidity conditions exhibited good initial curing properties and excellent adhesion, as can be seen from the excellent results of forced peeling testing, cutting testing, durability testing and heat shock testing. In addition, in Examples 1, 3 to 5 and 7 in which the formulation ratio of the radical polymerizable monomer to the cationic polymerizable monomer was 50:50, particularly good results were obtained.

On the contrary, in Comparative Example 1 in which an unsaturated dicarboxylic acid was not added and in Comparative Example 3 in which the radical polymerizable monomer was not added, insufficient results in terms of adhesion and initial curing properties were obtained particularly when the polarizing plates were prepared under high humidity conditions. In Comparative Example 2 in which the cationic polymerizable monomer was not added and in Comparative Example 5 in which the unsaturated dicarboxylic acid anhydride was added in a small amount, the polarizing plates prepared under any condition showed insufficient adhesion. In addition, in Comparative Example 4 in which the unsaturated dicarboxylic acid anhydride was added in an excessive amount, the polarizing plate was reduced in initial curing properties and had insufficient adhesion.

From the comparison between the inventive examples and the comparative examples, it can be seen that the adhesive compositions obtained using the radical polymerizable monomer, cationic polymerizable monomer and unsaturated dicarboxylic acid in a certain ratio range suppressed curing inhibition due to moisture and thus had improved initial curing properties and adhesion.

The invention claimed is:

1. An adhesive composition for a polarizing plate, the adhesive composition comprising:
   (A) 26.1 parts by weight to 79.8 parts by weight of a radical polymerizable monomer;
   (B) 20 parts by weight to 60.9 parts by weight of a cationic polymerizable monomer;
   (C) 0.2 parts by weight to 13 parts by weight of an unsaturated dicarboxylic acid anhydride; and
   (D) 0.5 parts by weight to 10 parts by weight of an initiator, based on 100 parts by total weight of (A), (B) and (C).

2. The adhesive composition according to claim 1, wherein the (D) initiator includes: (D1) a radical polymerization initiator, (D2) a cationic polymerization initiator, or a mixture thereof.

3. The adhesive composition according to claim 2, wherein the (D1) radical polymerization initiator is present in an amount of 0.5 parts by weight to 5 parts by weight based on 100 parts by total weight of (A), (B) and (C), and the (D2) cationic polymerization initiator is present in an amount of 0.5 parts by weight to 5 parts by weight based on 100 parts by total weight of (A), (B) and (C).

4. The adhesive composition according to claim 1, wherein the unsaturated dicarboxylic acid anhydride includes at least one of maleic anhydride and itaconic anhydride.

5. The adhesive composition according to claim 1, wherein the radical polymerizable monomer is present in an amount of 45 parts by weight to 55 parts by weight, the cationic polymerizable monomer is present in an amount of 55 parts by weight to 45 parts by weight, and the unsaturated dicarboxylic acid anhydride is present in an amount of 0.8 parts by weight to 8 parts by weight.

6. The adhesive composition according to claim 1, wherein the radical polymerizable monomer includes a monomer having any one of an acryloyl group, a methacryloyl group, a vinyl group, and an allyl group, and the cationic polymerizable monomer includes a monomer having any one of an epoxy group, an oxetane ring, and a vinyl ether group.

7. The adhesive composition according to claim 1, further comprising: (E) a photosensitizer.

8. The adhesive composition according to claim 7, wherein the (D) initiator includes (D2) a cationic polymerization initiator, and the (E) photosensitizer is present in an amount of 0.1 to 5 parts by weight based on 100 parts by total weight of (A), (B) and (C).

9. A polarizing plate comprising a protective film and a polarizer attached to each other by the adhesive composition as claimed in claim 1.

* * * * *